Figure 1:
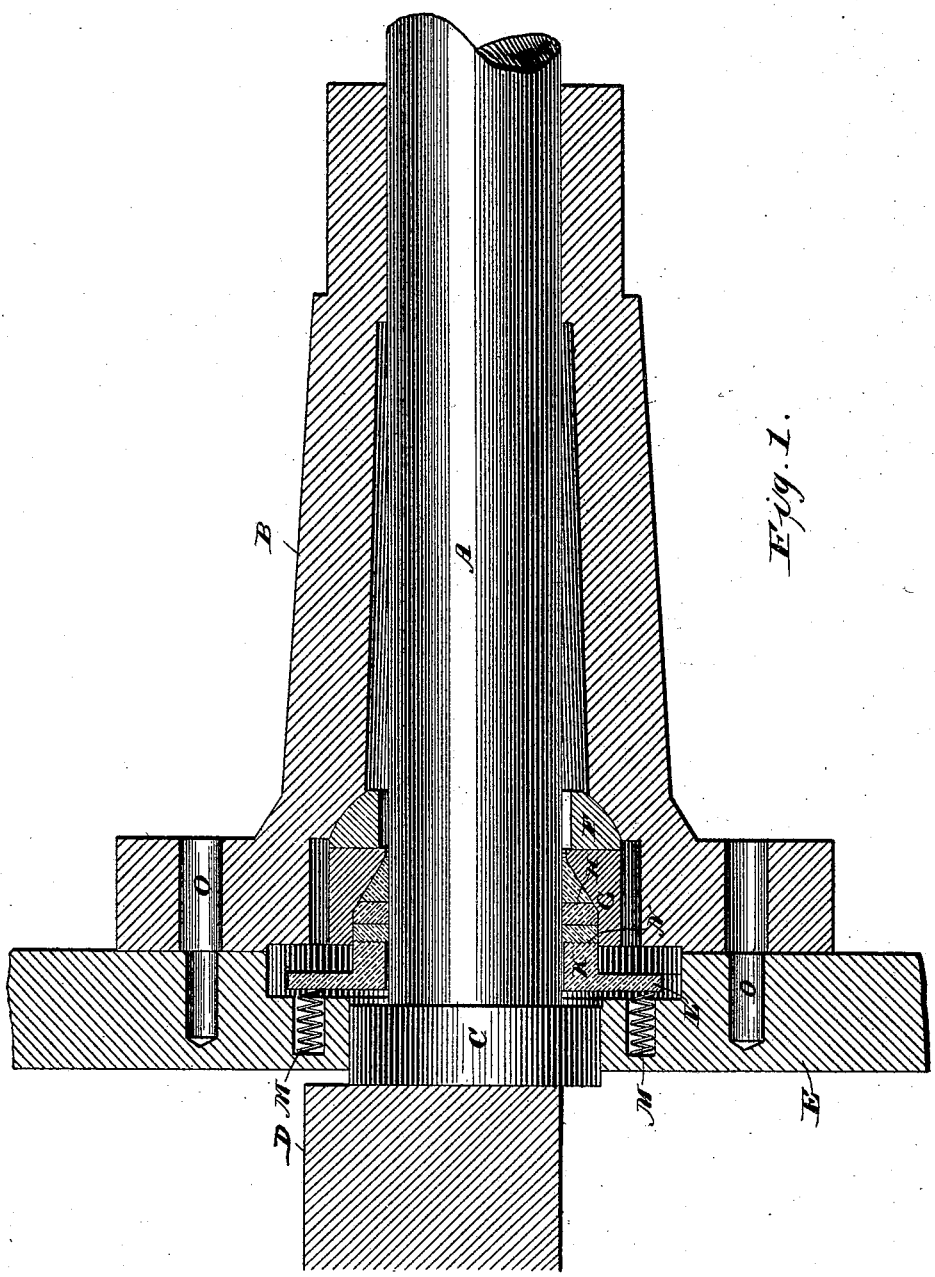

(No Model.) 2 Sheets—Sheet 1.

E. P. MONROE.
METALLIC PACKING.

No. 464,331. Patented Dec. 1, 1891.

Witnesses
Louis G. Julihn
E. P. Elwell

Inventor
E. P. Monroe
By Hopkins & Atkins
Attorneys

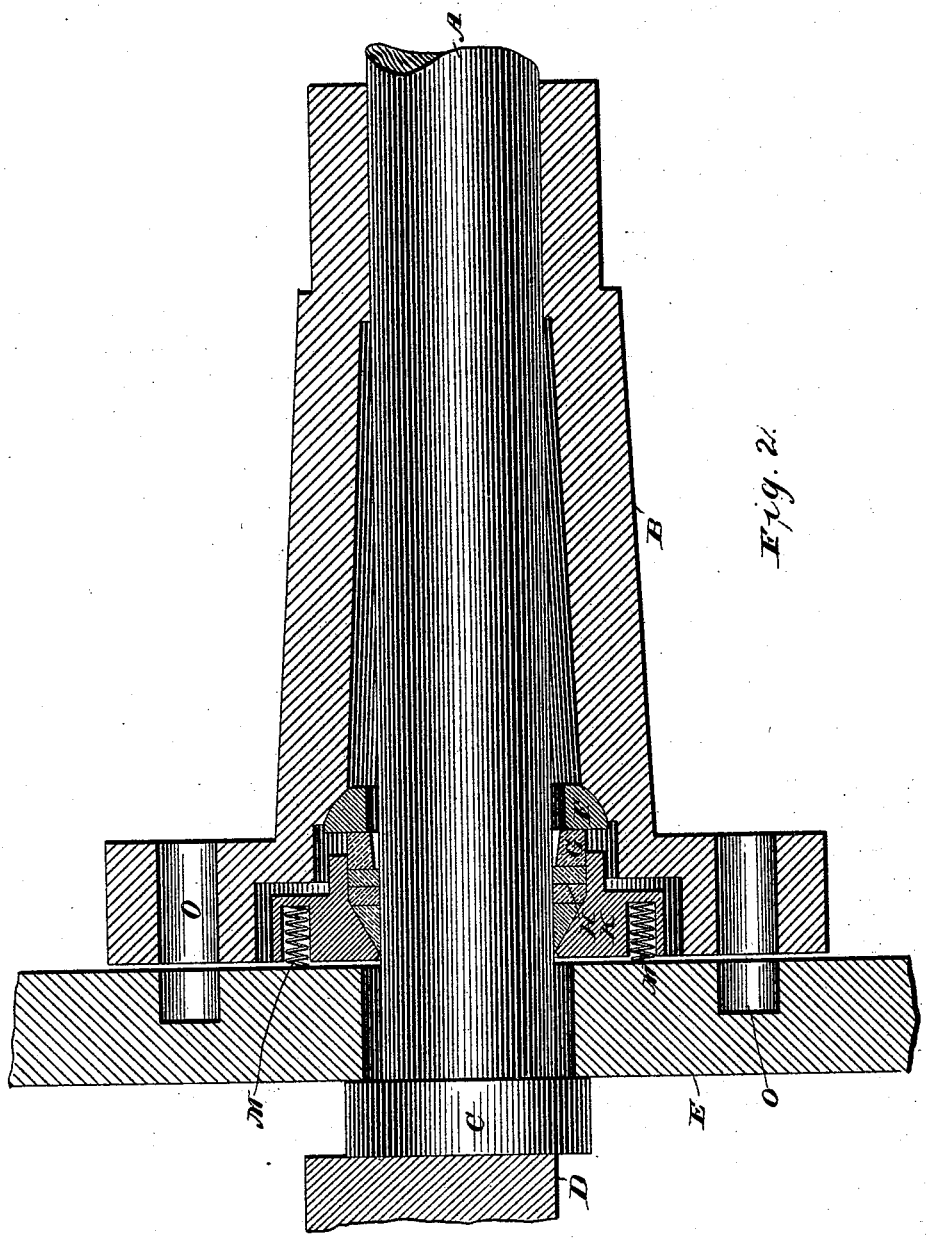

UNITED STATES PATENT OFFICE.

EDWIN PEAR MONROE, OF PHILADELPHIA, PENNSYLVANIA.

METALLIC PACKING.

SPECIFICATION forming part of Letters Patent No. 464,331, dated December 1, 1891.

Application filed January 13, 1891. Serial No. 377,636. (No model.)

*To all whom it may concern:*

Be it known that I, EDWIN PEAR MONROE, of Philadelphia, county of Philadelphia, and State of Pennsylvania, have invented certain new and useful Improvements in Metallic Packing, of which the following is specification, reference being had to the accompanying drawings.

My improvements relate more particularly to metallic packings suitable to be employed in connection with spindles or shafts that have rotary or oscillatory movement in their bearings—such, for example, as the valve-spindles of Corliss engines, calender-rolls, or other rotating surfaces which require steam-tight packings.

My improvements are designed not only to be applicable to new work, but are also applicable as substitutes for the packings of old machinery.

For convenience of illustration I have shown in Figure 1 a longitudinal diametrical section of the valve-stem of a Corliss engine with so many of its connected parts as are necessary to illustrate the construction and operation of my improvements. Fig. 2 shows the parts of the packing in reversed position to those shown in Fig. 1. In this figure the spring-sockets are shown as being in the follower instead of being in the adjacent wall of the steam-chest.

Referring to the letters upon the drawings, A indicates a shaft, which may be, for example, the stem of a Corliss engine, the axle of a calender-roll, or other rod or shaft.

B indicates a packing-case substituted for the bracket ordinarily used in connection with the valve-stem of a Corliss engine. In this construction it will be observed that the head of the packing-case is elongated, forming a support for the outer end of the valve-stem.

C indicates a collar ordinarily used upon such a stem, and D a wing for operating the valve.

E indicates one of the walls of a steam-chest, and F a ball-and-socket ring.

The foregoing parts are common in somewhat different forms to each one of the figures of the drawings.

Referring particularly to Fig. 1, G indicates a vibrating cup; H, packings encircled and held in place by the cup, and K the annular follower, provided with an outwardly-projecting flange L.

M indicates coiled springs seated in sockets within the wall of the steam-chest and bearing at one end against the follower-flange and serving to press the follower against the packing and the latter into the vibrating cup, so as to keep it always in steam-tight contact with the shaft. These springs being located well out from the shaft and bearing forcibly against the flange of the follower, serve to prevent it from rotating with the shaft.

N indicates a serrated or roughened surface of the follower, by which it engages with the packing, so as to prevent the latter from turning in its place within the vibrating cup on account of the motion of the shaft.

O indicates bolt-holes for securing the packing-case to the wall of the steam-chest.

By means of the construction and relations of the parts described I secure a very excellent steam-tight durable metallic packing, well adapted to coincide with all of the lateral vibratory movements of the shaft either of a Corliss or other engine or machine.

Fig. 2 shows a modification in which the vibrating cup and packing are in reversed position to that shown in Fig. 1, and the vibrating cup is enlarged in diameter to enable the springs to be inserted within sockets in its outer part. These springs have their bearing against the plain surface of the steam-chest, and they not only compensate for the wear of the packing-rings H, but by being placed at a suitable radial distance from the axis of the stem obtain sufficient leverage by bearing upon the face of the steam-chest to prevent the vibrating cup twisting with the rotary oscillations of the valve-stem.

Other modifications of my improvements might be employed without departing from the substance of my invention; but I have illustrated a sufficient number to show its general application.

What I claim is—

1. The combination of a steam-chest, a packing-case secured to the chest, a stem, a metallic packing having a radial extension, and springs bearing at one end against the radial projection of the packing structure and at the other end bearing against the steam-chest, whereby compensation for wear is secured and rotary oscillation of the vibrating cup is prevented, substantially as set forth.

2. In a metallic packing, a follower provided with a roughened or serrated surface in contact with the annular packing, whereby the packing is prevented from rotating with the shaft, substantially as set forth.

3. In a metallic packing, the combination, with a steam-chest, of an elongated packing-case secured to the chest and having a bearing at its outer end for the purpose of supporting a rotary spindle and at the other end having a recess to receive a ball-and-socket ring, against which the packing abuts, substantially as set forth.

In testimony of all which I have hereunto subscribed my name.

EDWIN PEAR MONROE.

Witnesses:
THOS. HOPKINS,
C. P. ELWELL.